Dec. 23, 1952     A. G. F. WALLGREN     2,622,947
DOUBLE ROW ROLLER BEARING
Filed May 1, 1946           2 SHEETS—SHEET 1
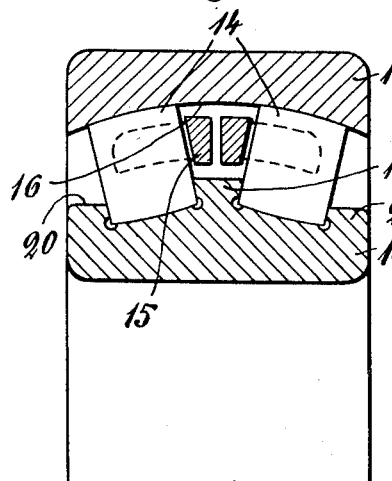
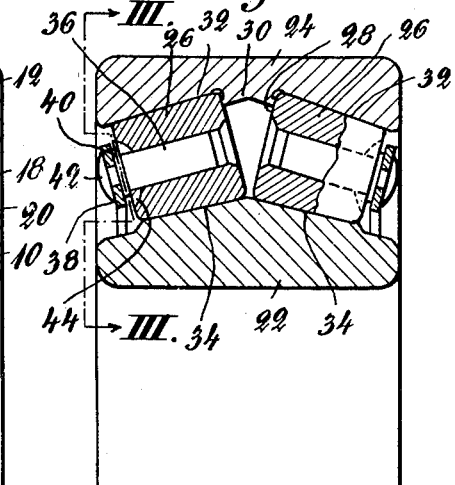
PRIOR ART
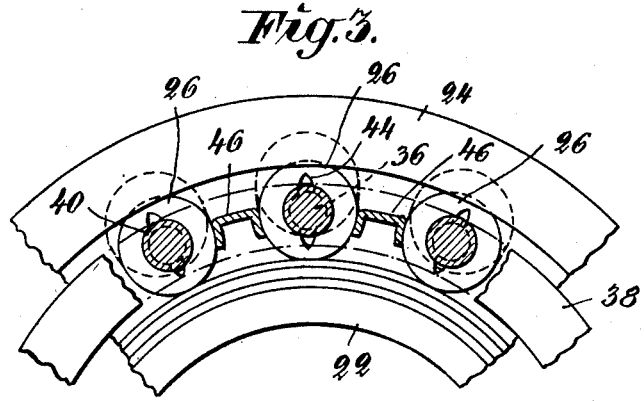
INVENTOR
August G. F. Wallgren
BY
Jarvis C. Marble
his ATTORNEY

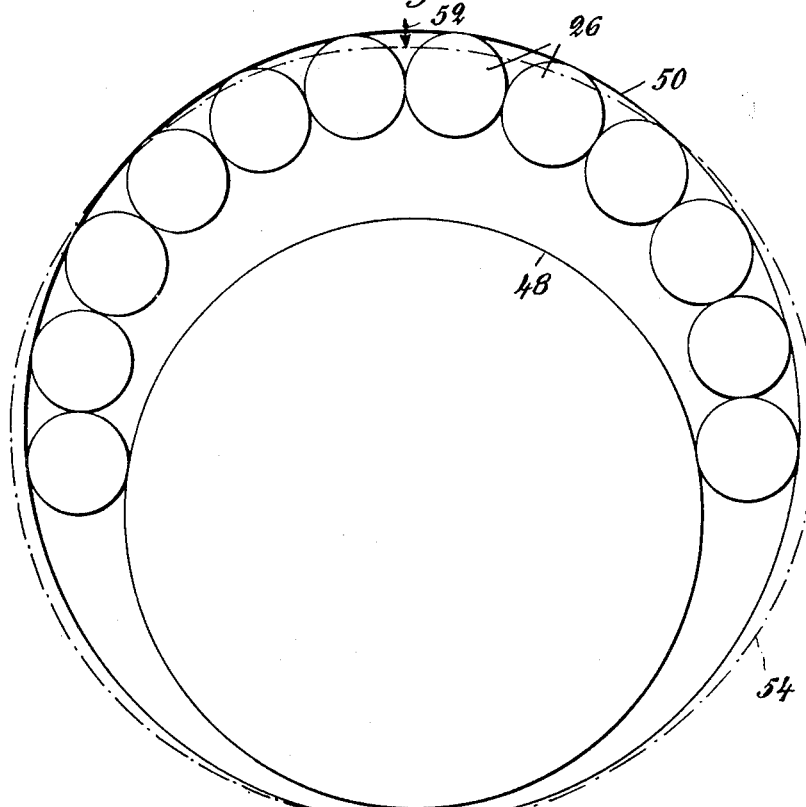
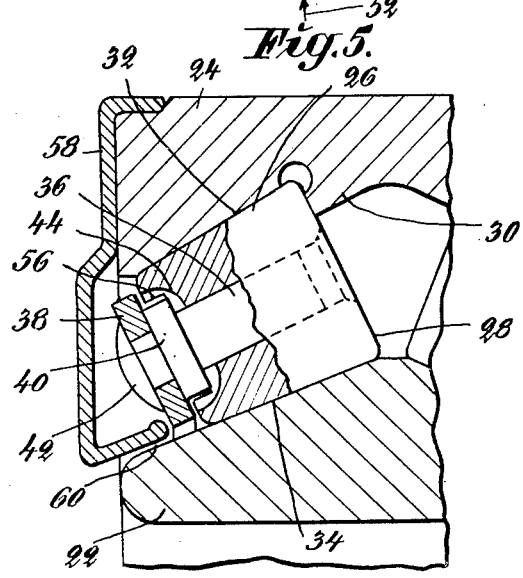

Patented Dec. 23, 1952

2,622,947

UNITED STATES PATENT OFFICE 2,622,947

DOUBLE ROW ROLLER BEARING

August Gunnar Ferdinand Wallgren, Stockholm, Sweden

Application May 1, 1946, Serial No. 666,373
In Sweden May 17, 1945

6 Claims. (Cl. 308—214)

My invention relates to roller bearings comprising two bearing members or rings with intermediate rollers arranged in two rows and adapted to sustain radial thrust as well as axial thrust, the latter in both directions. Bearings of this type and in the form of a coherent unit, which may thus be mounted in its place without any special adjusting measures have hitherto been constructed with an internal spherical roller surface on the outer ring, and corresponding roller surfaces on the inner ring for the rollers. A bearing of this kind is shown in Fig. 1, wherein 10 designates the inner ring, 12 the outer ring, 14 the rollers, and 15 the retainers for the latter. The outer ring has a spherical internal surface 16 extending over the whole of the width of the ring, so that the inner ring, the retainers and the rollers may be turned relative to the outer ring for the purpose of assembling or disassembling the rollers without hindrance from the undivided outer ring. The inner ring 10 is provided with two races for the correspondingly constructed rollers 14, said races being limited laterally, first, by a central flange 18, and second, by a lateral flange 20 for each row of rollers. The spherical shape of the surface 16 has been provided to permit the bearing to be assembled on the one hand, and to make the bearing self-adjusting even at a pronounced obliquity or curvature of the shafts mounted in the bearings on the other hand. The latter property of roller bearings or ball bearings was important hitherto, for instance in the case of transmission shafts of small diameter, which cannot be mounted with sufficient accuracy, and which are subjected to curvature. However, such transmission shafts nowadays occur only in exceptional cases and, above all, the bearing type in question finds its greatest use in machines, wherein such a precision with respect to the parallelism and so forth of the shafts is required for reasons quite unconcerned that no self-adjusting property is called for in the bearings. In this respect roller and ball bearings differ from sliding friction bearings, the oil film of which calls for the satisfaction of quite other demands than do roller contact surfaces.

It is known per se to construct bearings with conical rollers. In one form in which they are available in the market, they have only one single row of rollers, and consequently they are capable of taking up axial thrust in one axial direction only. Furthermore, the bearing in itself does not form any finished unit to be mounted in its entirety, but depends for its proper function on an adjustment of the mutual axial position of the bearing rings between flanges or the like on the shaft or on the bearing housing. The same is true, as far as conical roller bearings of the double row type, hitherto in use is concerned. One of the rings is here divided in a plane at right angles to the shaft, so that every row of rollers has its own outer or inner ring. This latter construction thus also calls for special adjusting measures for the individual bearing members relative to each other, when the bearing is assembled. If on the other hand the outer ring is divided in a plane paralleling the shaft, the result will be no practically useful bearing, inasmuch as the race of the ring becomes interrupted by joints.

The main object of the invention is to provide a double row bearing having the advantages of the spherical bearing in the respects above referred to, that is to say in regard to the mounting and the capacity of the bearing to sustain axial stresses in both directions, while the bearing according to the invention is at the same time superior to the spherical bearing, inter alia as regards its load capacity, both radially and axially.

According to international standard, roller bearings are manufactured in three series for the same shaft diameter, which are of different bearing widths and sometimes of different external diameters and thus of different load capacities. It is a further object of the invention to provide a double row roller bearing of the unit type having a great axial length on the rollers, whereby the bearing can be manufactured in all of the three series. This is on the other hand not the case with spherical double row roller bearings, owing to the fact that the rollers become too narrow in the smallest series.

Further objects and advantages of the invention will be apparent from the following description considered in connection with the accompanying drawing, which form a part of this specification, and of which:

Fig. 1 shows, as stated, a sectional view of part of a double row roller bearing of a known type.

Fig. 2 is a sectional view of part of a double row roller bearing made according to the invention.

Fig. 3 is a sectional view of part of the bearing, in part sectioned on the line III—III of Fig. 2.

Fig. 4 illustrates diagrammatically how the rollers are assembled in the bearing.

Fig. 5 is a sectional view of part of a double row roller bearing according to a somewhat modified embodiment according to the invention.

In the embodiment shown in Figs. 2–4 there are two rows of conical rollers 26 disposed between the inner ring 22 and the outer ring 24, said rollers abutting with their inner end surfaces 28 against a central flange 30 in the outer ring. The latter has two races 32 of a conical or approximately conical shape, the diameter of which increases in a direction toward the centre of the outer ring. Likewise, the inner ring 22 has two races 34, one for each row of rollers, the diameter of which increases in a direction toward the centre of the ring. The races 32, 34 for a row of rollers and the conical surface of the rollers converge in such manner as to form a portion of the envelopes of cones, the apexes meeting each other at a common point of the bearing axis, said point being situated on the same side of the centre of the bearing as the row of rollers under consideration. Inasmuch as the diameter of the races increases inwardly, any lubricant met by the rollers 26 will be thrown inwardly toward the centre of the bearing. It will be understood from the above that the position of the rollers 26 becomes fixed in both axial directions by an axial guide flange 30, which is only arranged on the outer ring 24 at the centre thereof. By this means the rollers 26 in the two rows of rollers may be disposed very close to one another at the inner ring 22, so that they obtain a great length and thus a great sustaining capacity.

The relative positions of the rollers 26 are fixed with the aid of a retainer composed of pins 36 and a ring 38 extending around the bearing. The pins 36 enter with a sliding fit into central bores in the rollers 26 and preferably have a flange 40 of a greater diameter, which is disposed between the ring 38 and the end surface of the rollers. Furthermore, the pins engage apertures in the ring 38. After the pins 36 have been introduced separately into the bores of the rollers, the ring 38 is applied, whereupon the pins are rigidly connected with the ring, for instance by the end portions of the pins projecting outside the ring being riveted to the latter, as indicated at 42. During the riveting operation, the rollers 26 abut with their end surfaces 28 against the flange 30. The pins 36 cannot now be retracted from the rollers 26, inasmuch as they extend obliquely relative to the bearing axis. Between the rollers 26 and the retainer above described there is a cooperative relation in so far as the retainer fixes the relative position of the rollers in the circumferential direction, while the rollers in turn fix the position of the retainer in the axial direction.

Adjacent to the flange 40 there are provided lubricating grooves 44 in the rollers 26 for the supply of lubricant to the sliding surfaces between the pins and the bores of the rollers. Between two rollers 26 there may be inserted a support 46 (Fig. 3), which is rigidly connected to the holder ring 38.

Inasmuch as the rollers 26 of the finished bearing are guided in both axial directions relative to the inner and outer rings 22, 24, which are each constructed as an integral unit both in planes perpendicular to the bearing axis and in planes paralleling the same, the rings must upon assembly of the rollers take the relative positions indicated in Fig. 4. In this figure, 48 designates, for instance, the greatest diameter of the inner race 34, and the outer circle 50 likewise denotes the greatest diameter of the outer race 32. Inasmuch as the inner ring is eccentric relative to the outer ring, a number of rollers 26 may be introduced between the rings. This number is limited by the decreasing distance between the circles 48, 50 in a direction toward that point where they are nearest to each other. By the outer ring being now compressed through an elastic deformation by means of forces acting according to the arrows 52 in Fig. 4, the race of the outer ring will take an oval shape as indicated by the chain-dotted line 54, which renders possible the introduction of further rollers in between the rings. After the two bearing rings have finally been brought into a concentric position relative to each other, the roller holder is applied. The total number of rollers, with which the bearing may be provided in this manner, amounts to about 75–80% of the number of rollers of a spherical double row roller bearing. However, since the rollers attain a greater axial length than in such bearings, a compensation is obtained, which amply covers the reduction of the load capacity involved by the smaller number of rollers.

The embodiment according to Fig. 5, where the same reference numerals are used as in the preceding embodiment for equivalent parts, differs from said embodiment in that the flanges 40 of the pins 36 are countersunk into corresponding counterbores 56 in the end surface of the rollers 26, whereby the roller retainer occupies less space in axial direction. Otherwise the races 32, 34 are made with a very great angle of inclination, so that the bearing can sustain very great axial thrusts. The bearings may be provided with sealing shields 58, which are connected to the outer ring 24 and which at their inner edge form a sealing gap 60 adjacent to the conical surface 34.

The invention may also be applied in needle bearings or so-called rolling bushings, which are of special importance in such cases where a small radial space is available for the bearings. The lubricating grooves 44 may be provided in the pins 36 instead of in the rollers 26.

While two more or less specific embodiments of the invention have been shown, it is to be understood that this is for purpose of illustration only, and that the invention is not to be limited thereby, but its scope is to be determined by the appended claims.

What I claim is:

1. A double row roller bearing comprising inner and outer bearing members having pairs of races for the reception therebetween of opposed rows of tapered rollers, a row of tapered rollers between each pair of races, each of said rollers having an axial bore therein and the axes of the rollers being inclined with respect to the axis of the bearing, and a retainer for each row of rollers, each of said retainers comprising a series of pins engaging the bores of the respective rollers and a ring member rigidly connecting the pins to circumferentially locate the rollers, each of said pins having a flange located between a ring member and the adjacent end of a roller and the inclined pins acting to axially locate the retainer.

2. A double row roller bearing comprising inner and outer bearing members having pairs of races for the reception therebetween of opposed rows of tapered rollers, a row of tapered rollers between each pair of races, each of said rollers having an axial bore therein and the axes of the rollers being inclined with respect to the axis of the bearing, and a retainer for each row of rollers, each of said retainers comprising a series of pins engaging the bores of the respective rollers and a ring member rigidly connecting the pins to circumferentially locate the rollers, the ends of the rollers adjacent to the ring members being counterbored and the pins having flanges located in said counterbores, the inclined pins acting to axially locate the retainer.

3. A double row roller bearing comprising an outer bearing member internally flanged to provide abutment surfaces, an inner bearing member, said members having pairs of races inclined radially outwardly toward the axial center of the bearing for the reception therebetween of opposed rows of tapered rollers, the races of the inner member comprising tapered surfaces extending substantially to the axial center of the bearing, a row of tapered rollers between each pair of races, each of said rollers having an axial bore and the larger ends of the rollers of the two rows being in closely adjacent confronting relation and engaging said abutment surfaces, and a retainer for each row of rollers, each of said retainers comprising a plurality of pins each engaging the bore of one of said rollers and a circumferentially extending member carrying said pins in peripherally spaced relation and constituting the sole peripheral connection between said pins.

4. A bearing as set forth in claim 3 in which each retainer is provided with a series of supporting elements rigidly connected to the circumferentially extending member of the retainer and extending between the rollers of the row.

5. A bearing as set forth in claim 3 in which groove means are provided for supplying lubricant to the ends of the bores of the rollers facing the circumferentially extending member of the retainer.

6. A bearing as set forth in claim 3 in which the ends of the rollers facing the circumferentially extending members of the retainers are grooved to supply lubricant to the roller bores.

AUGUST GUNNAR FERDINAND WALLGREN.

REFERENCES CITED

The following references are of record in the file of this patent:

UNITED STATES PATENTS

| Number | Name | Date |
|---|---|---|
| 1,183,658 | Lockwood | May 16, 1916 |
| 1,404,420 | Brush | Jan. 24, 1922 |
| 1,552,031 | Birgh | Sept. 1, 1925 |
| 1,884,925 | Vanderbeek | Oct. 25, 1932 |
| 1,941,460 | Boden | Jan. 2, 1934 |
| 2,130,379 | Chilton | Sept. 20, 1938 |
| 2,231,350 | Ringle | Feb. 11, 1941 |
| 2,267,708 | Cox | Dec. 30, 1941 |

FOREIGN PATENTS

| Number | Country | Date |
|---|---|---|
| 600,090 | France | Jan. 29, 1926 |